US012643351B2

(12) United States Patent (10) Patent No.: US 12,643,351 B2
Barnett et al. (45) Date of Patent: Jun. 2, 2026

(54) WEDGE-LOCK DRAWBAR HITCH ASSEMBLY

(71) Applicant: MACDON INDUSTRIES LTD., Winnipeg (CA)

(72) Inventors: Neil Barnett, Winnipeg (CA); Cyrus Nigon, Lake Mills, WI (US); Konstantin Kolegaev, Winnipeg (CA)

(73) Assignee: MACDON INDUSTRIES LTD., Winnipeg (CA)

( * ) Notice: Subject to any disclaimer, the term of this patent is extended or adjusted under 35 U.S.C. 154(b) by 680 days.

(21) Appl. No.: 18/015,120

(22) PCT Filed: Jul. 7, 2020

(86) PCT No.: PCT/US2020/070241
§ 371 (c)(1),
(2) Date: Jan. 9, 2023

(87) PCT Pub. No.: WO2022/010532
PCT Pub. Date: Jan. 13, 2022

(65) Prior Publication Data
US 2023/0256782 A1 Aug. 17, 2023

(51) Int. Cl.
*B60D 1/07* (2006.01)
*A01B 59/042* (2006.01)
(Continued)

(52) U.S. Cl.
CPC ............ *B60D 1/075* (2013.01); *A01B 59/042* (2013.01); *B60D 1/02* (2013.01); *B60D 2001/008* (2013.01)

(58) Field of Classification Search
CPC .... B60D 1/075; B60D 2001/008; B60D 1/02; B60D 1/143; A01B 59/042; B66B 5/22; B62D 25/209
See application file for complete search history.

(56) References Cited

U.S. PATENT DOCUMENTS 137,719 A * 4/1873 Pursell ..................... B60D 1/02
213/194
278,235 A * 5/1883 Gossett ..................... B60D 1/02
213/219
(Continued)

FOREIGN PATENT DOCUMENTS

DE 102008029918 A1 * 12/2009 ............... B60D 1/06

*Primary Examiner* — Timothy Wilhelm
(74) *Attorney, Agent, or Firm* — Miller Canfield

(57) ABSTRACT
A drawbar hitch assembly for coupling to a drawbar to pull an agricultural implement includes a pair of locking wedges mounted between a first and a second hitch plate. Each locking wedge is slidably engaged with an inwardly-facing ramp of the second hitch plate for movement between a locked position adapted to cradle the drawbar therebetween and an unlocked position spaced apart and adapted to be released from the drawbar. A plurality of fasteners releasably couple the first and second hitch plates. The fasteners are tightened to move the second hitch plate in a first direction, thereby urging the locking wedges to the locked position to secure the drawbar hitch assembly to the drawbar. The fasteners may also be loosened to move the second hitch plate in an opposite second direction, thereby returning the locking wedges to the unlocked position to remove the drawbar hitch assembly from the drawbar.

17 Claims, 7 Drawing Sheets

(51) Int. Cl.
　　*B60D 1/00*　　　　(2006.01)
　　*B60D 1/02*　　　　(2006.01)

(56)　　　　　　References Cited

U.S. PATENT DOCUMENTS

| | | | | | |
|---|---|---|---|---|---|
| 2,062,788 | A | * | 12/1936 | Jacob | B60D 1/00 |
| | | | | | 280/477 |
| 2,444,876 | A | * | 7/1948 | Kuhl | B60D 1/02 |
| | | | | | 280/495 |
| 2,873,982 | A | * | 2/1959 | Graham | B60D 1/155 |
| | | | | | 280/499 |
| 3,279,819 | A | * | 10/1966 | Edmonds | B60D 1/155 |
| | | | | | 280/479.3 |
| 3,503,628 | A | * | 3/1970 | Lowry | B60D 1/07 |
| | | | | | 280/495 |
| 3,888,507 | A | * | 6/1975 | Berghausen | B60D 1/02 |
| | | | | | 280/759 |
| 3,930,670 | A | * | 1/1976 | Haskins | B60D 1/50 |
| | | | | | 280/476.1 |
| 4,515,387 | A | * | 5/1985 | Schuck | B60D 1/40 |
| | | | | | 280/479.2 |
| 4,664,402 | A | * | 5/1987 | Kober | B60D 1/06 |
| | | | | | 280/455.1 |
| 5,193,625 | A | * | 3/1993 | Goll | B60D 1/07 |
| | | | | | 172/248 |
| 5,277,446 | A | * | 1/1994 | Hamel | B60D 1/38 |
| | | | | | 280/479.3 |
| 5,351,516 | A | * | 10/1994 | Bialy | B66B 7/1246 |
| | | | | | 72/244 |
| 5,997,025 | A | * | 12/1999 | Wisecarver | B60D 1/28 |
| | | | | | 280/511 |
| 6,487,799 | B2 | * | 12/2002 | Burk | B60D 1/00 |
| | | | | | 37/903 |
| 6,564,907 | B1 | * | 5/2003 | Sasaki | B66B 5/22 |
| | | | | | 187/373 |
| 6,902,183 | B2 | * | 6/2005 | Rodgers | B60D 1/00 |
| | | | | | 280/514 |
| 6,942,237 | B1 | * | 9/2005 | Depault | B60D 1/52 |
| | | | | | 280/491.5 |
| 7,581,746 | B2 | * | 9/2009 | Abate | B62D 53/125 |
| | | | | | 403/321 |
| 7,712,761 | B2 | * | 5/2010 | Mater, Jr. | B60D 1/50 |
| | | | | | 280/441 |
| 8,332,687 | B1 | | 12/2012 | Faccio et al. | |
| 8,465,043 | B1 | * | 6/2013 | Buckert | B60D 1/243 |
| | | | | | 280/507 |
| 8,596,664 | B2 | * | 12/2013 | Lahn | B60D 1/241 |
| | | | | | 280/495 |
| 8,960,709 | B2 | * | 2/2015 | Prescott | B60D 1/52 |
| | | | | | 280/515 |
| 8,998,240 | B2 | * | 4/2015 | Boittin | A01B 59/002 |
| | | | | | 280/495 |
| 9,027,950 | B2 | * | 5/2015 | Lahn | B60D 1/52 |
| | | | | | 280/506 |
| 9,174,501 | B2 | * | 11/2015 | Marcy | B60D 1/075 |
| 9,802,452 | B1 | * | 10/2017 | McCall | B60D 1/075 |
| 2004/0136781 | A1 | * | 7/2004 | Parent | B60D 1/52 |
| | | | | | 403/379.3 |
| 2004/0150189 | A1 | * | 8/2004 | Deanda | B60D 1/54 |
| | | | | | 280/491.1 |
| 2008/0296098 | A1 | * | 12/2008 | Sato | B66B 5/22 |
| | | | | | 187/376 |
| 2009/0005804 | A1 | | 1/2009 | Esposito et al. | |
| 2009/0031529 | A1 | | 2/2009 | Hung | |
| 2011/0210530 | A1 | * | 9/2011 | Hancock | B60D 1/02 |
| | | | | | 280/506 |
| 2013/0154235 | A1 | * | 6/2013 | Boittin | B60D 1/025 |
| | | | | | 280/491.5 |
| 2013/0272773 | A1 | | 10/2013 | Kamen et al. | |
| 2014/0015039 | A1 | | 1/2014 | Hossain | |
| 2018/0030470 | A1 | | 2/2018 | Tao et al. | |

* cited by examiner

WEDGE-LOCK DRAWBAR HITCH ASSEMBLY

BACKGROUND OF THE INVENTION

1. Field of the Invention

The present invention relates to a drawbar hitch assembly for coupling to a drawbar to pull an agricultural implement.

2. Description of Related Art

Drawbar hitch assemblies for coupling to a drawbar to pull an agricultural implement are known in the art. Typical drawbar hitch assemblies include a first hitch plate releasably coupled to a second hitch plate. The first and second hitch plates are arranged for movement between a locked position to cradle the drawbar therebetween and an unlocked position adapted to be released from the drawbar. The second hitch plate is operable in a first direction for moving the first and second hitch plates to the locked position to secure the drawbar hitch assembly to the drawbar. The second hitch plate is also operable in an opposite second direction for returning the first and second hitch plates to the unlocked position to remove the drawbar hitch assembly from the drawbar. However, typical drawbar hitch assemblies known in the art have difficulty maintaining consistent positioning between an agricultural vehicle and the agricultural implement, which is often necessary to properly align drivelines of certain pull-type agricultural implements. Furthermore, many drawbar hitch assemblies known in the art are mechanically complex and can only couple to drawbars of certain limited widths.

SUMMARY OF THE INVENTION

According to one aspect of the invention, a drawbar hitch assembly is provided for coupling to a drawbar to pull an agricultural implement. The drawbar hitch assembly includes a first hitch plate and a second hitch plate. The second hitch plate is releasably coupled to the first hitch plate and includes a pair of inwardly-facing ramps. A pair of locking wedges is mounted between the first and second hitch plates. Each locking wedge is slidably engaged with one of the inwardly-facing ramps for movement between a locked position in which the locking wedges are adapted to cradle the drawbar therebetween and an unlocked position in which the locking wedges are spaced apart and adapted to be released from the drawbar. The second hitch plate is operable in a first direction for urging the locking wedges to the locked position to secure the drawbar hitch assembly to the drawbar. The second hitch plate is also operable in an opposite second direction for returning the locking wedges to the unlocked position to remove the drawbar hitch assembly from the drawbar.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
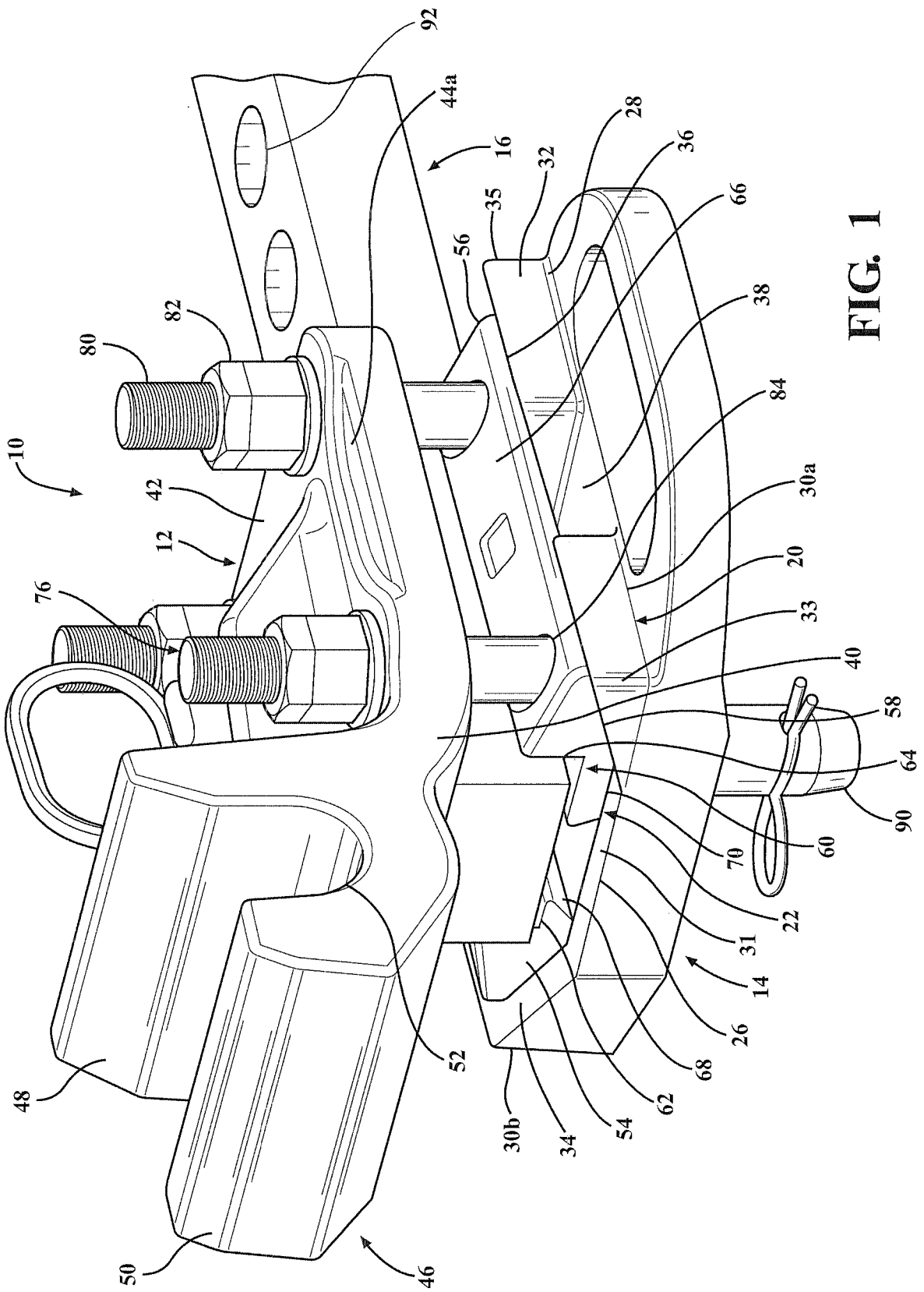
FIG. 1 is a perspective view of a drawbar hitch assembly coupled to a drawbar to pull an agricultural implement according to a primary embodiment of the present invention.
Figure 2:
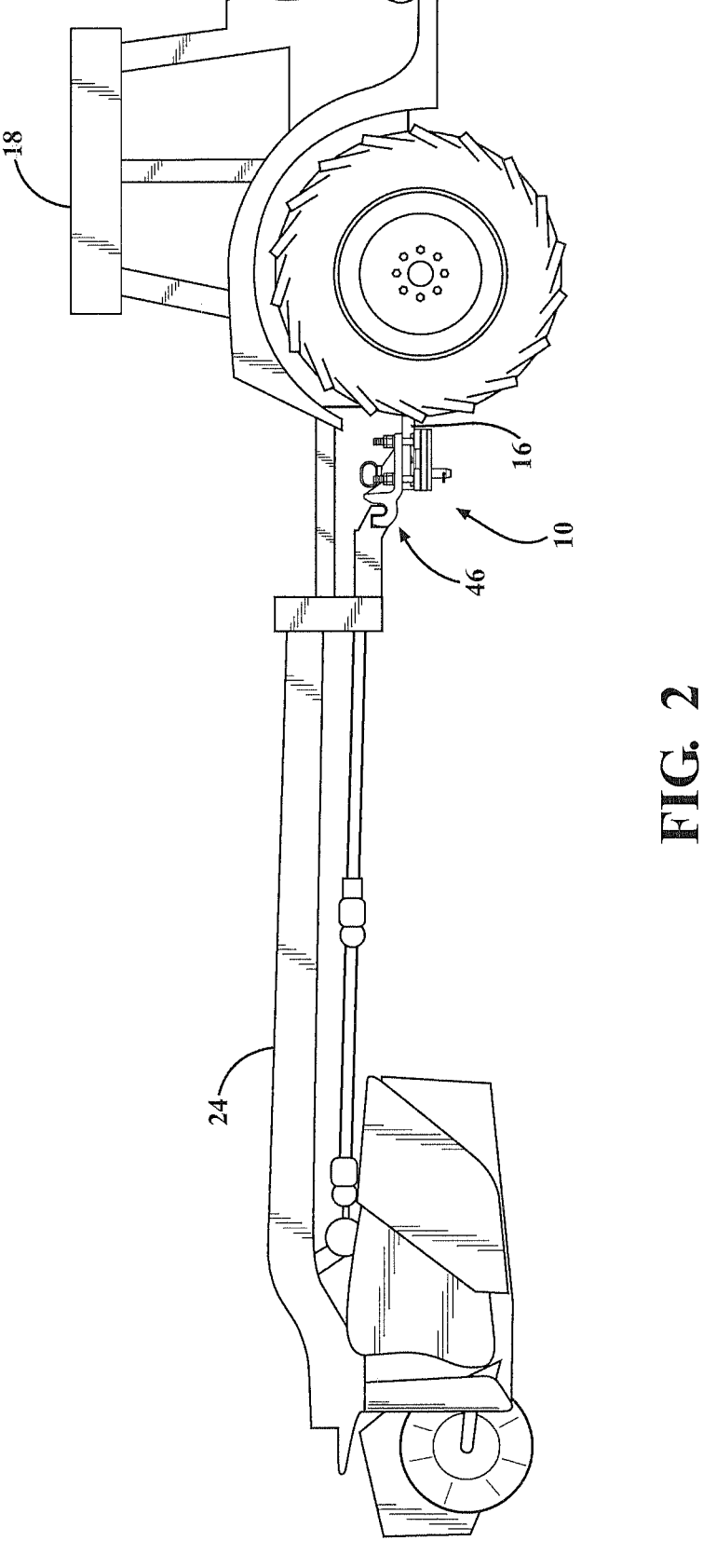
FIG. 2 is a side view of the drawbar hitch assembly of FIG. 1 showing the drawbar hitch assembly secured to the drawbar extending from a tractor and further coupled to a pull-type mower.

Referring to the Figures, wherein like numerals indicate like or corresponding parts throughout the several views, a drawbar hitch assembly for coupling to a drawbar to pull an agricultural implement is shown generally at 10. The drawbar hitch assembly 10 includes a first hitch plate 12 releasably coupled to a second hitch plate 14 for receiving and securing a drawbar 16 therebetween. The drawbar 16 extends from an agricultural vehicle 18, such as a tractor, as shown in FIG. 2. However, it is to be appreciated that the drawbar 16 may alternatively extend from any number of suitable self-propelled vehicles without varying the scope of the invention. Referring to FIG. 1, the second hitch plate 14 includes a pair of laterally spaced apart and inwardly-facing ramps 20. A pair of laterally spaced apart locking wedges 22 is mounted between the first and second hitch plates 12, 14, and each locking wedge 22 is slidably engaged with one of the ramps 20 for selectively cradling and securing the drawbar 16 within the drawbar hitch assembly 10. When the drawbar hitch assembly 10 is secured to the drawbar 16, the agricultural implement 24, such as a pull-type mower, can be connected to the first hitch plate 12 of the drawbar hitch assembly 10 for operation behind the agricultural vehicle 18, as shown in FIG. 2.

Figure 3:
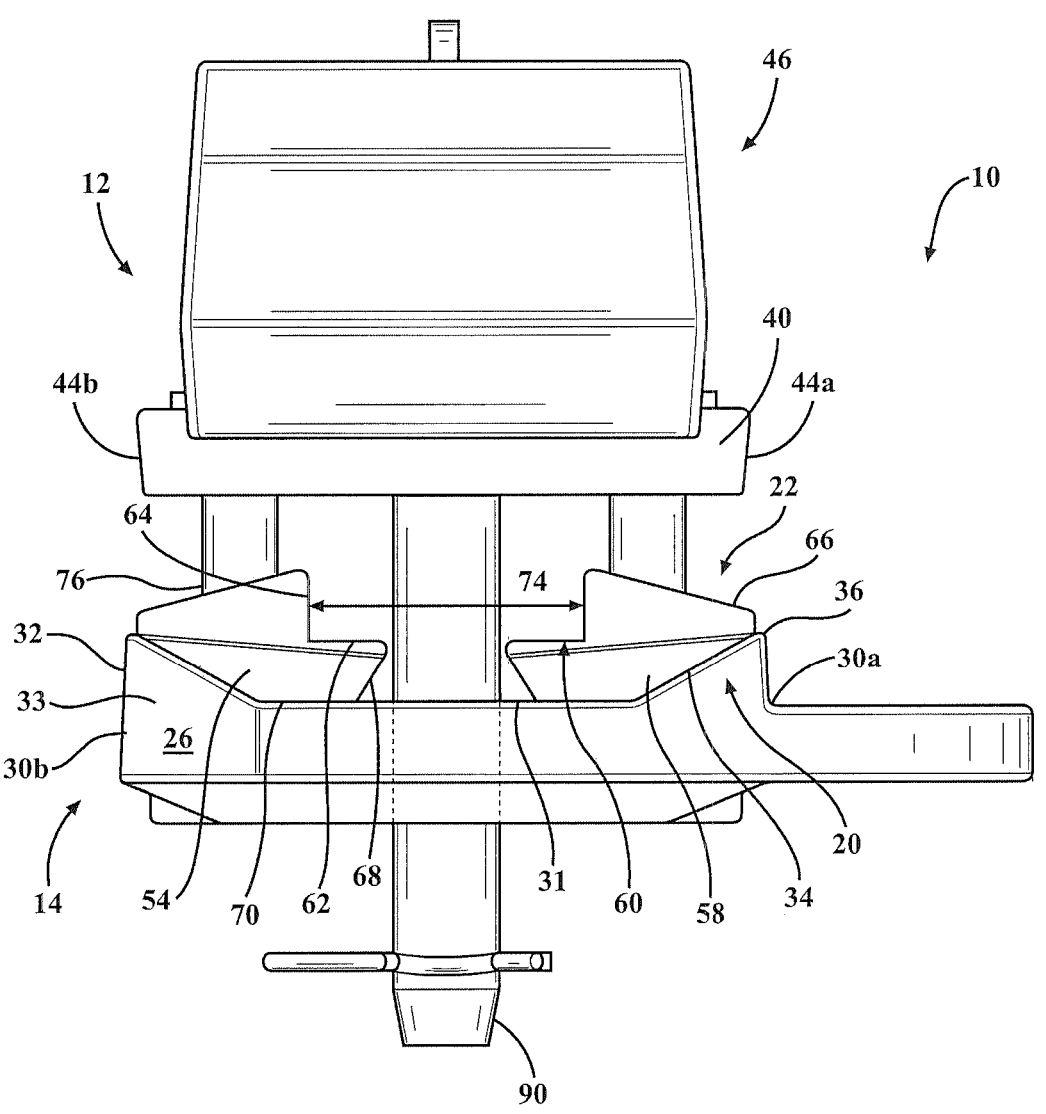
FIG. 3 is a front view of the drawbar hitch assembly of FIG. 1 showing the drawbar hitch assembly prior to coupling with the drawbar.
Figure 4:
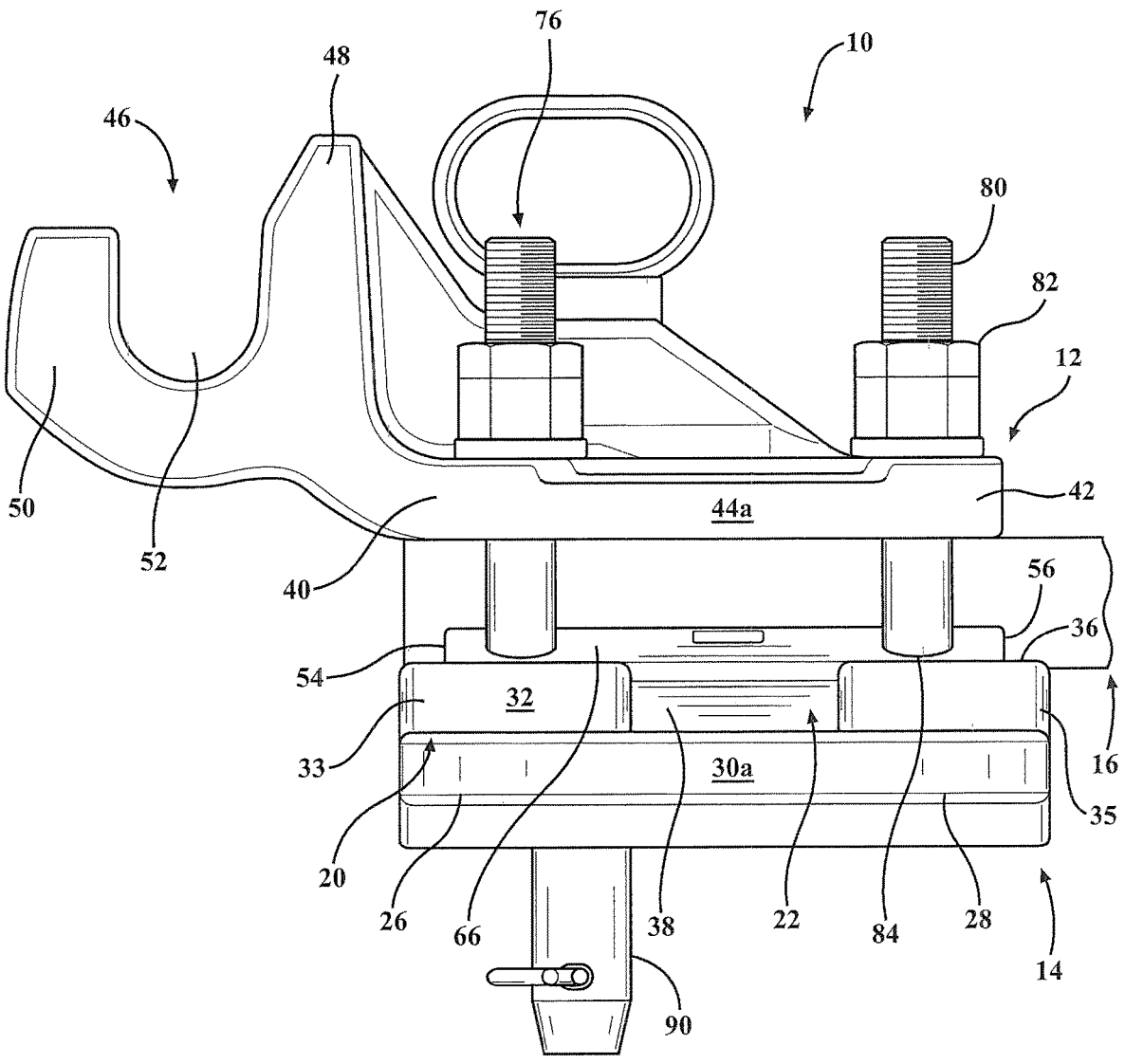
FIG. 4 is a side view of the drawbar hitch assembly of FIG. 1.

Referring to FIG. 1, the second hitch plate 14 extends between a front portion 26 and a rear portion 28 with opposite first and second lateral edges 30a, 30b. The ramps 20 are disposed adjacent each of the first and second lateral edges 30a, 30b of the second hitch plate 14 with a generally planar floor 31 extending therebetween. Each ramp 20 extends between a front and a rear portion 33, 35, wherein the front and rear portions 33, 35 of the ramps 30 correspond to the front and rear portions 26, 28 of the second hitch plate 14. Referring to FIG. 3, each ramp 20 has a substantially planar lateral side 32 intersecting a substantially planar sloped or inclined engagement side 34 at an upper edge 36. The lateral side 32 of each ramp 20 extends vertically from each respective first and second lateral edge 30*a*, 30*b* of the second hitch plate 14 and terminates at each upper edge 36. The engagement side 34 of each ramp 20 extends inwardly between the upper edge 36 and the floor 31 of the second hitch plate 14 such that the ramps 20 are laterally spaced apart with the floor 31 therebetween. In a primary embodiment of the drawbar hitch assembly 10, as shown in FIGS. 1 and 4, a center open channel 38 bisects each ramp 20 to reduce surface friction between the ramps 20 and the locking wedges 22. However, it is to be appreciated that one or both of the ramps 20 may include or omit the channel 38, or may include any number of channels 38, without varying the scope of the invention. Further, the channel 38 may be located in any number of positions between the front and rear portions 33, 35 of the ramps 20 without varying the scope of the invention.

The first hitch plate 12 similarly extends between a front portion 40 and a rear portion 42 with opposite first and second lateral edges 44*a*, 44*b*. Referring to FIG. 1, the first hitch plate 12 is positioned above the second hitch plate 14 relative to the drawbar 16 such that the front and rear portions 40, 42 of the first hitch plate 12 are vertically aligned with and correspond to the front and rear portions 26, 28 of the second hitch plate 14. A coupling element 46 extends from the front portion 40 of the first hitch plate 12 for operably connecting to the agricultural implement 24, as shown in FIG. 2. In the primary embodiment of the drawbar hitch assembly 10, as shown in FIG. 4, the coupling element 46 includes a rear wall 48 extending substantially vertically from the first hitch plate 12 and a front wall 50 extending outwardly and upwardly from the rear wall 48 to define a semi-annular recess 52 therebetween. The semi-annular recess 52 is adapted to receive and cradle a horizontally elongated pin for connecting to the agricultural implement 24 and allowing the agricultural implement 24 to pitch fore and aft during operation to maintain proper alignment between a driveline of the agricultural implement 24 and a power take-off (PTO) of the agricultural vehicle 18. However, it is to be appreciated that the first hitch plate 12 may incorporate any suitable alternative coupling elements for operably connecting to different types of agricultural implements without varying the scope of the invention.

Figure 5:
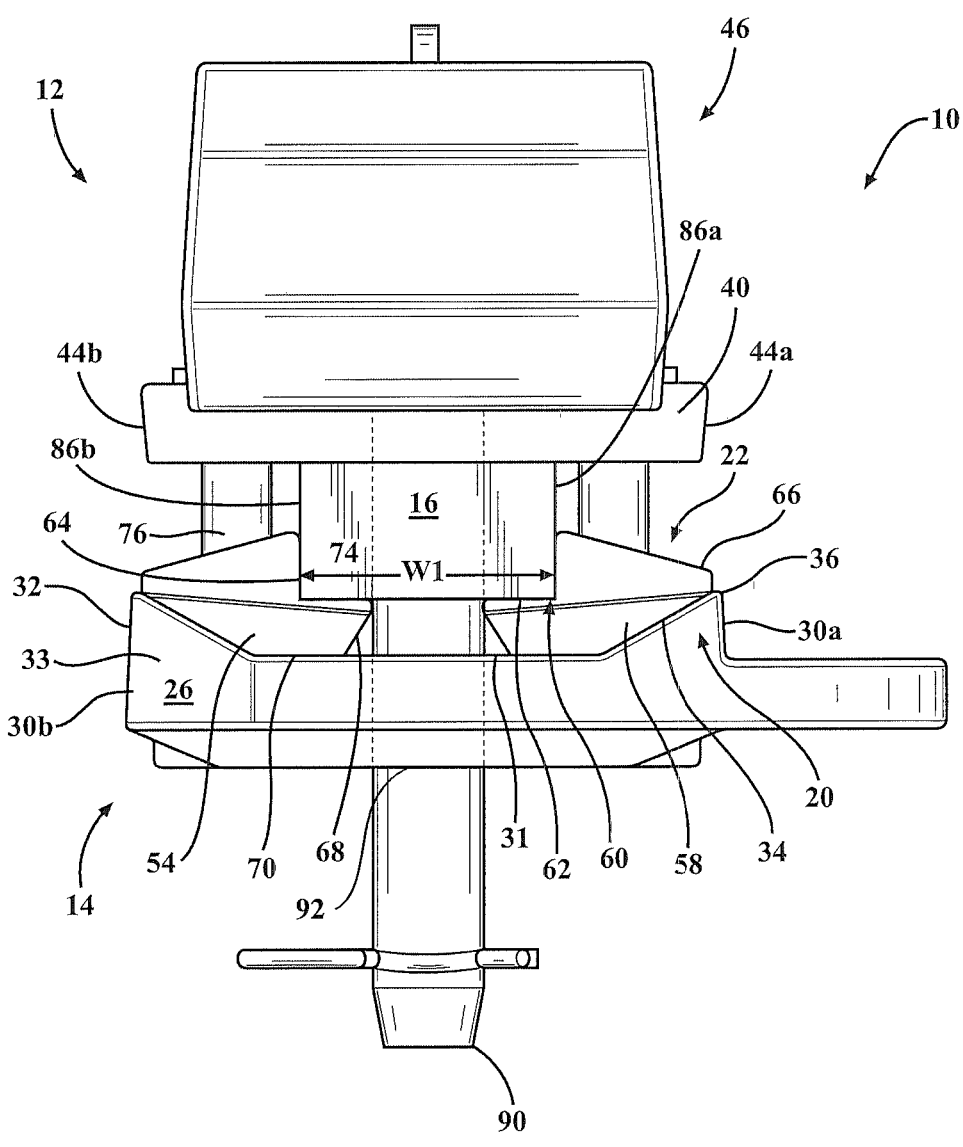
FIG. 5 is a front view of the drawbar hitch assembly of FIG. 1 with a pair of locking wedges arranged for accommodating a drawbar with a smaller width.
Figure 6:
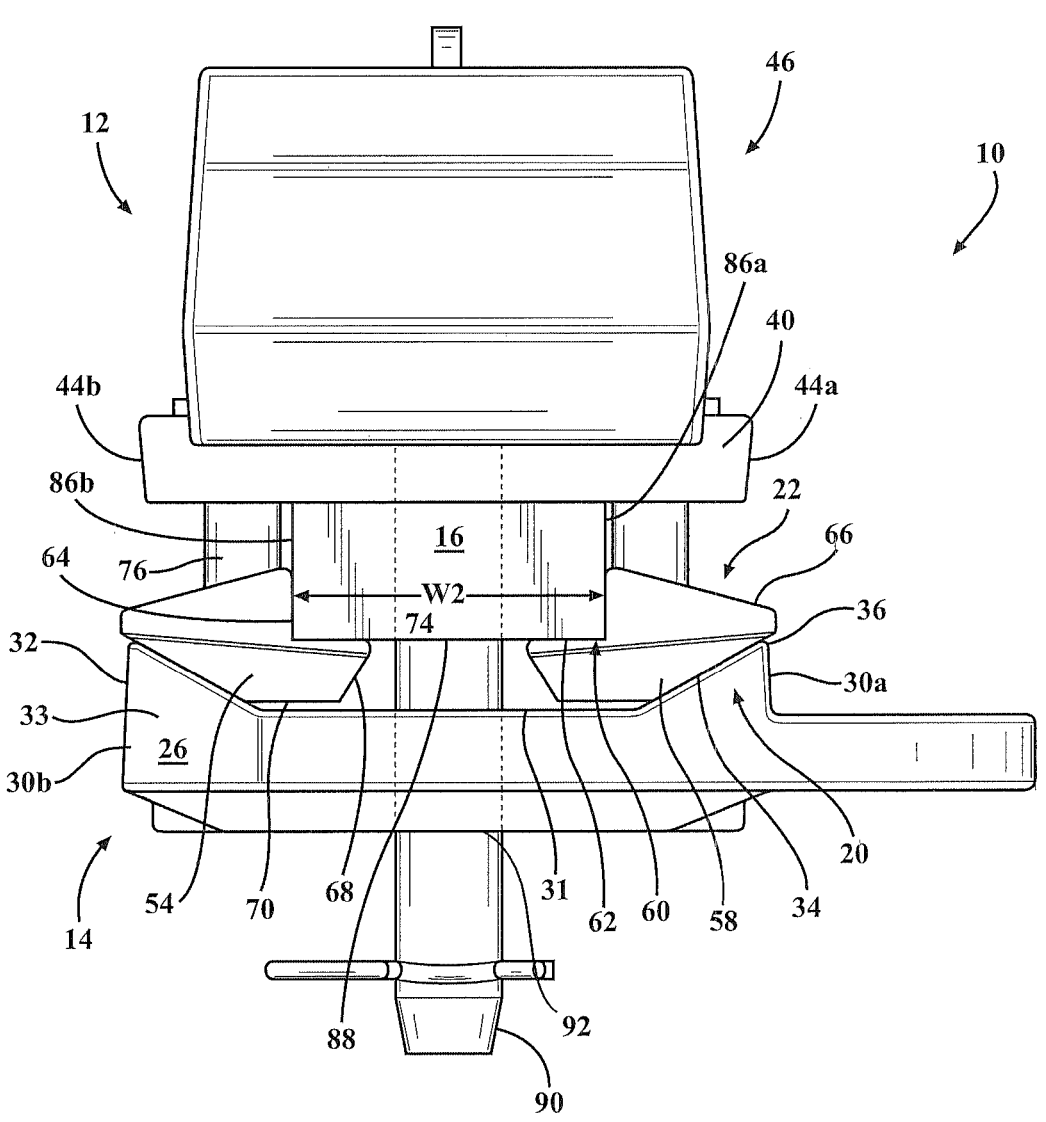
FIG. 6 is a front view of the drawbar hitch assembly of FIG. 1 with the pair of locking wedges arranged for accommodating a drawbar with a larger width.

Referring to FIG. 3, the locking wedges 22 are mounted between the first and second hitch plates 12, 14 and are laterally spaced apart such that each respective locking wedge 22 is slidably engaged with one of the ramps 20 of the second hitch plate 14. The locking wedges 22 extend between the front and the rear portions 33, 35 of the ramps 20 and have opposite first and second ends 54, 56, as shown in FIGS. 1 and 4. Referring to FIGS. 5 and 6, each locking wedge 22 has a substantially planar sloped side 58 for engaging the engagement side 34 of the ramps 20. The sloped side 58 is disposed opposite an angular cutout 60 on the wedge 22 for engaging the drawbar 16. The angular cutouts 60 are defined by a horizontal side 62 intersecting a vertical side 64 at a substantially right angle adapted for receiving the drawbar 16 therebetween. The locking wedges 22 also include a top side 66 extending between the vertical side 64 of the angular cutout 60 and the sloped side 58 of the locking wedge 22.

In the primary embodiment of the drawbar hitch assembly 10, as shown in FIGS. 3, 5, and 6, each locking wedge 22 further includes a medial side 68 and a bottom side 70. The medial side 68 extends downwardly from the horizontal side 62 of the angular cutout 60 toward the floor 31 of the second hitch plate 14 to intersect the bottom side 70 of the locking wedge. The bottom side 70 extends laterally from the sloped side 58 of the locking wedge 22 to the medial side 68 and is arranged to selectively engage the floor 31 of the second hitch plate 14. However, it is to be appreciated that one or both locking wedges 22 may omit the bottom side 70 of the locking wedge 22 such that the medial side 68 of the locking wedge 22 extends directly between the horizontal side 62 of the angular cutout 60 and the sloped side 58 of the locking wedge 22 without engaging the floor 31 of the second hitch plate 14. Further, it is to be appreciated that the locking wedges 22 may include any suitable number of sides or may take any suitable shape without varying the scope of the invention.

Figures 7A, 7B, 7C:
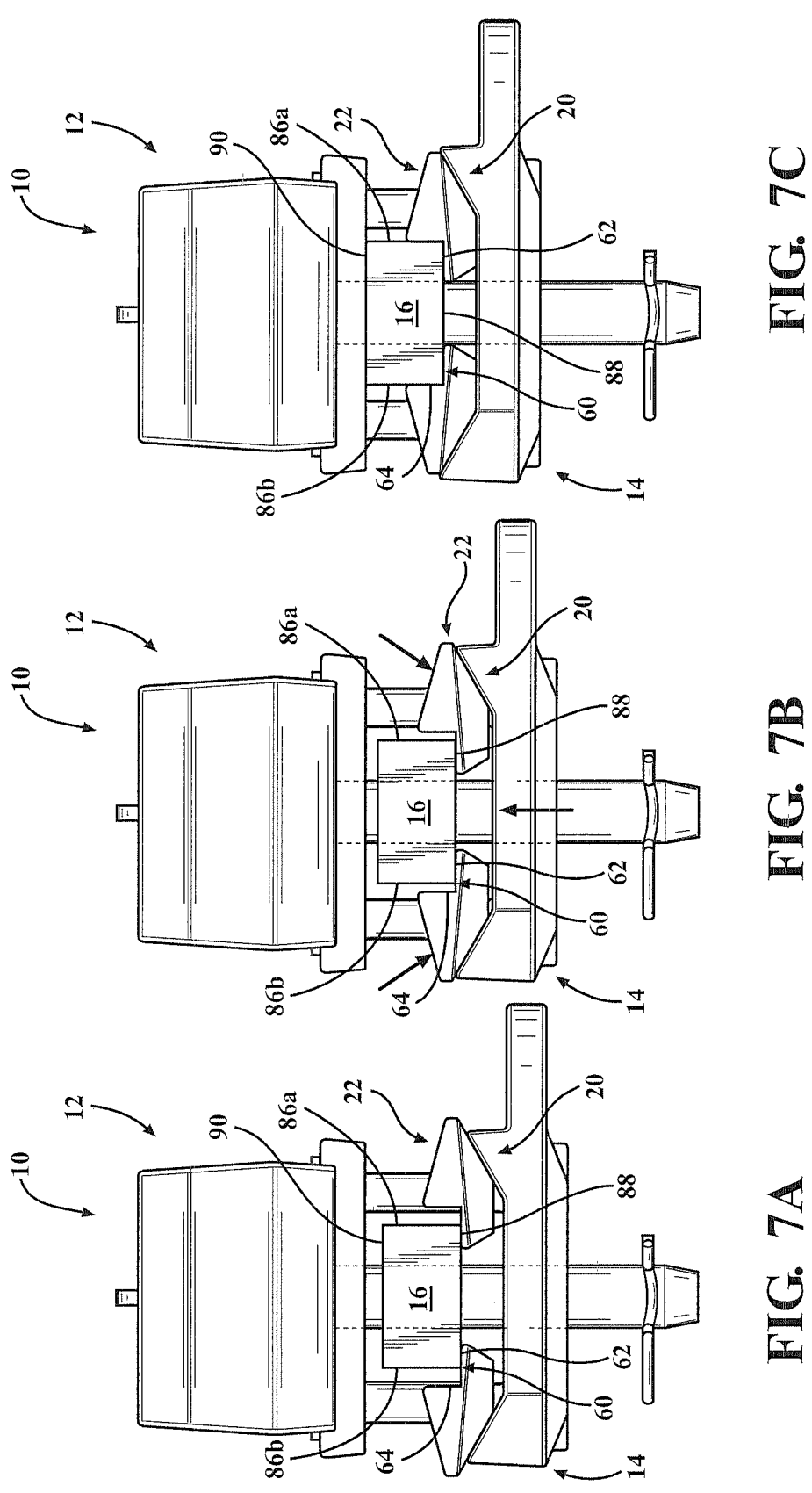
FIG. 7A is a front view of the drawbar hitch assembly of FIG. 1 showing the pair of locking wedges in an unlocked position for removing the drawbar hitch assembly from the drawbar.
FIG. 7B is a front view of the drawbar hitch assembly of FIG. 1 showing the second hitch plate moving in a first direction to urge the pair of locking wedges to slide inwardly along a pair of ramps toward the locked position.
FIG. 7C is a front view of the drawbar hitch assembly of FIG. 1 showing the pair of locking wedges in the locked position and the drawbar secured between the locking wedges and the first hitch plate.

Referring to FIGS. 5 and 6, the locking wedges 22 are slideable along the ramps 20 for movement between a locked position adapted to cradle the drawbar 16 therebetween and an unlocked position spaced apart and adapted to be released from the drawbar 16. The drawbar 16 is a generally elongated, rectangular bar which may be releasably coupled to a receiver in the rear of the agricultural vehicle 18. The drawbar 16 includes opposite lateral sides 86*a*, 86*b* extending between a top side 87 and a bottom side 88. In the locked position, as shown in FIGS. 5, 6, and 7C, the drawbar 16 is cradled between the angular cutouts 60 of the locking wedges 22 such that the opposite lateral sides 86*a*, 86*b* of the drawbar 16 are engaged by and secured between the vertical sides 64 of the angular cutouts 60. Further, in the locked position, the bottom side 88 of the drawbar 16 is engaged with and supported by the horizontal sides 62 of the angular cutouts 60. In the unlocked position, as shown in FIGS. 7A and 7B, the vertical sides 64 of the angular cutouts 60 are disengaged and spaced from the lateral sides 86*a*, 86*b* of the drawbar 16. Further, in the unlocked position, the horizontal sides 62 of the angular cutouts 60 are disengaged and spaced from the bottom side 88 of the drawbar 16 for removing the drawbar hitch assembly 10 from the drawbar 16.

Referring to FIG. 3, a gap 74 is defined between the vertical sides 64 of each locking wedge 22. The locking wedges 22 are slidably adjustable outwardly and inwardly along the ramps 20 to respectively increase and decrease the gap 74 between the vertical sides 64 of each locking wedge 22 for accommodating drawbars 16 of various widths therebetween. The locking wedges 22 are slideable inwardly along the ramps 20 in the locked position to decrease the gap 74 between the locking wedges 22 for accommodating drawbars 16 with smaller widths W1, as shown in FIG. 5. Similarly, the locking wedges 22 are slideable outwardly along the ramps 20 in the unlocked position to increase the gap 74 between the locking wedges for accommodating drawbars 16 with larger widths W2, as shown in FIG. 6.

The drawbar hitch assembly 10 further includes a plurality of fasteners 76 extending between and releasably coupling the first and second hitch plates 12, 14 and mounting the locking wedges 22 therebetween, as shown in FIGS. 1 and 4. In the primary embodiment of the drawbar hitch assembly 10, the fasteners 76 extend through four pairs of corresponding holes, the holes disposed at each corner formed by both lateral edges 44*a*, 44*b* and the front and rear portions 40, 42 of the first hitch plate 12 and both lateral edges 30*a*, 30*b* of the front and rear portions 26, 28 of the second hitch plate 14. However, it is to be appreciated that any suitable number, type, and arrangement of fasteners may be present to releasably couple the first and second hitch plates 12, 14 without varying the scope of the invention. Referring to FIGS. 1 and 4, a pair of elongated slots 84 are spaced apart and parallel between the first and second ends 54, 56 of each locking wedge 22. The slots 84 each extend vertically through the locking wedges 22 for insertion of the fasteners 76 therethrough to mount the locking wedges 22 between the first and second hitch plates 12, 14 and to guide movement of the locking wedges 22 along the ramps 20.

Referring to FIGS. 1 and 4, the fasteners 76 each include a threaded portion 80 for insertion of a tightening component, such as a threaded nut 82, thereon. The nuts 82 can be tightened to move the second hitch plate 14 in a first direction toward the first hitch plate 12. Movement of the second hitch plate 14 in the first direction urges the locking wedges 22 to the locked position for securing the drawbar 16 between the locking wedges 22, and ultimately, the first hitch plate 12, as shown in FIGS. 7B and 7C. The nuts 82 can also be loosened to move the second hitch plate 14 in an opposite second direction away from the first hitch plate 12. Movement of the second hitch plate in the second direction simultaneously movies the locking wedges 22 to the unlocked position for removing the drawbar hitch assembly 10 from the drawbar 16, as shown in FIG. 7A. Additionally, a removable pin 90 known in the art may extend through a set of corresponding central holes 92 in the first hitch plate 12, the drawbar 16, and the second hitch plate 14 to position the drawbar hitch assembly 10 longitudinally along the drawbar 16 and also further secure the drawbar hitch assembly 10 to the drawbar 16, as shown in FIGS. 5 and 6.

Referring to operation of the primary embodiment of the drawbar hitch assembly 10, the drawbar hitch assembly 10 is placed on the drawbar 16 such that the drawbar 16 is inserted between the first and second hitch plates 12, 14, as shown in FIG. 7A. The removable pin 90 is then inserted through the corresponding central holes 92 in the first hitch plate 12, the drawbar 16, and the second hitch plate 14 to properly position the drawbar hitch assembly longitudinally along the drawbar and to secure the drawbar 16 by preventing fore and aft movement of the drawbar hitch assembly 10 relative to the drawbar 16. The nuts 82 on the threaded portions 80 of each of the fasteners 76 are then tightened, thereby moving the second hitch plate 14, and correspondingly, the locking wedges 22, in the first direction toward the first hitch plate 12. Movement of the second hitch plate 14 in the first direction urges the wedges 22 inwardly along the downwardly sloped ramps 20 toward the locked position, as shown in FIG. 7B. Therefore, as the first hitch plate 12 and the angular cutouts 60 of the wedges 22 both engage the drawbar 16, the wedges 22 are urged to slide inwardly on the ramps 20, thereby decreasing the gap 74 between the angular cutouts 60 of each locking wedge 22 until the vertical sides 64 of each angular cutout 60 are engaged with the lateral sides 86a, 86b of the drawbar 16 to secure the drawbar 16 therebetween. When the fasteners 76 are fully tightened, as shown in FIG. 7C, the top side 87 of the drawbar 16 is engaged with and secured by the first hitch plate 12, the bottom side 88 of the drawbar 16 is engaged with and secured by the horizontal sides 62 of the angular cutouts 60, and the lateral sides 86a, 86b of the drawbar 16 are engaged with and secured between the vertical sides 64 of the angular cutouts 60. The agricultural implement 24 is then connected to the upper plate 12 of the drawbar hitch assembly 10 at the coupling element 46 for operation behind the agricultural vehicle 18, as shown in FIG. 2.

To remove the drawbar hitch assembly 10 from the drawbar 16, the nuts 82 on the threaded portions 80 of each of the fasteners 76 are loosened, thereby moving the second hitch plate 14 in the second direction away from the first hitch plate 12. Movement of the second hitch plate 14 in the second direction returns the wedges 22 to the unlocked position, thereby allowing the wedges 22 to slide outwardly along the ramps 20 such that the drawbar 16 is no longer secured between the wedges 22. When the fasteners 76 are fully loosened, as shown in FIG. 7A, the top side 87 of the drawbar 16 is no longer secured by the first hitch plate 12, the bottom side 88 of the drawbar 16 is disengaged and spaced from the horizontal sides 62 of the angular cutouts 60, and the lateral sides 86a, 86b of the drawbar 16 are disengaged and spaced from the vertical sides 64 of the angular cutouts 60. The removable pin 90 is then removed from the drawbar hitch assembly 10, and the drawbar hitch assembly 10 is able to be removed from the drawbar 16.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A drawbar hitch assembly for coupling to a drawbar to pull an agricultural implement, the drawbar hitch assembly comprising:
   a first hitch plate;
   a second hitch plate spaced from the first hitch plate and arranged to receive the drawbar therebetween, wherein the second hitch plate is releasably coupled to the first hitch plate and includes a pair of inwardly-facing ramps; and
   a pair of locking wedges mounted between the first and second hitch plates, each locking wedge slidably engaged with one of the inwardly-facing ramps for movement between a locked position adapted to cradle the drawbar therebetween and an unlocked position spaced apart and adapted to be released from the drawbar, and wherein the second hitch plate is operable in a first direction toward the drawbar urging the locking wedges to the locked position to secure the drawbar hitch assembly to the drawbar and an opposite second direction returning the locking wedges to the unlocked position to remove the drawbar hitch assembly from the drawbar.

2. The drawbar hitch assembly of claim 1 wherein the locking wedges are laterally spaced apart and slideable inwardly along the inwardly-facing ramps between the first and second hitch plates in the locked position and outwardly along the inwardly-facing ramps in the unlocked position to increase and decrease a gap between the locking wedges for accommodating drawbars of various widths.

3. The drawbar hitch assembly of claim 2 wherein the first hitch plate is releasably coupled to the second hitch plate by at least one releasable fastener extending therebetween.

4. The drawbar hitch assembly of claim 3 wherein actuating the at least one fastener in a first sense moves the second hitch plate in the first direction to urge the locking wedges to the locked position, and actuating the at least one fastener in a second sense moves the second hitch plate in the second direction to return the locking wedges to the unlocked position.

5. The drawbar hitch assembly of claim 4 wherein each of the locking wedges includes an elongated slot for receiving the at least one fastener therethrough to guide the locking wedges inwardly and outwardly between the locked and unlocked positions.

6. The drawbar hitch assembly of claim 5 wherein each of the locking wedges include an angular cutout defined by a horizontal side and a vertical side that intersect at a substantially right angle and adapted for receiving the drawbar therebetween.

7. The drawbar hitch assembly of claim 6 further comprising holes extending through the first and second hitch plates, the holes adapted for insertion of a removable pin therethrough to lock the drawbar therebetween.

8. The drawbar hitch assembly of claim 7 further comprising a coupling element extending from the first hitch plate, the coupling element adapted for operably connecting to the agricultural implement.

9. The drawbar hitch assembly of claim 8 wherein each inwardly-facing ramp includes a lateral side intersecting an inclined engagement side, the inclined engagement sides adapted for slideable movement of the locking wedges thereon.

10. The drawbar hitch assembly of claim 9 wherein the second hitch plate further includes a substantially planar floor extending between the inclined engagement side of each inwardly-facing ramp.

11. The drawbar hitch assembly of claim 10 wherein each of the locking wedges further include a sloped side disposed opposite the angular cutout and a top side extending therebetween, the sloped side arranged for slidably engaging the inclined engagement side of the inwardly-facing ramp.

12. The drawbar hitch assembly of claim 11 wherein each of the locking wedges further include a bottom side intersecting a medial side, the bottom side extending laterally from the sloped side of the locking wedge for selectively engaging the floor of the second hitch plate, and the medial side extending between the angular cutout and the bottom side of the locking wedge.

13. The drawbar hitch assembly of claim 12 further comprising a channel bisecting each inwardly-facing ramp for reducing surface friction between the inwardly-facing ramps and the locking wedges.

14. The drawbar hitch assembly of claim 13 wherein the coupling element includes a recess adapted to accept a horizontal pin of the agricultural implement for towing the agricultural implement with the drawbar hitch assembly.

15. The drawbar hitch assembly of claim 11 wherein each of the locking wedges further include a medial side extending between the angular cutout and the sloped side of the locking wedge.

16. The drawbar hitch assembly of claim 1 wherein the second hitch plate is movable in the first direction toward the first hitch plate for securing the drawbar between the first hitch plate and the second hitch plate.

17. The drawbar hitch assembly of claim 1 wherein movement of the second hitch plate in the first direction urges the drawbar into engagement with the first hitch plate.

\* \* \* \* \*